UNITED STATES PATENT OFFICE.

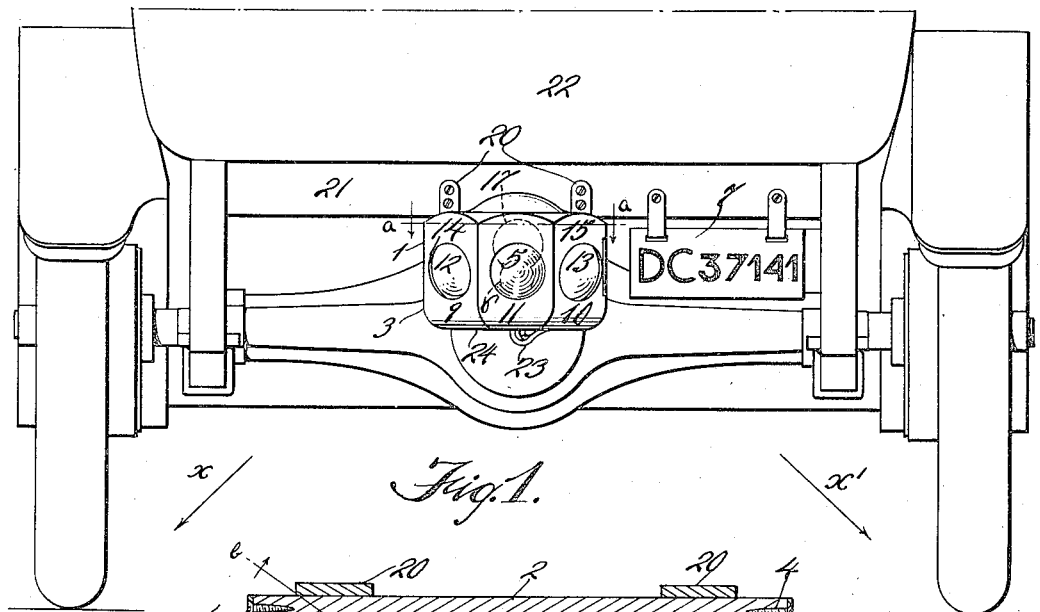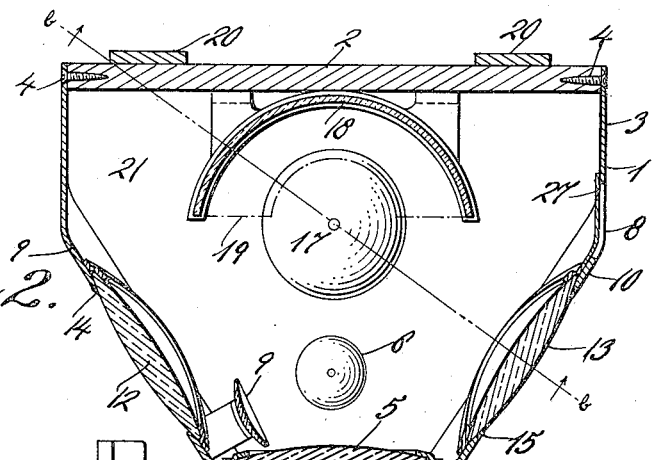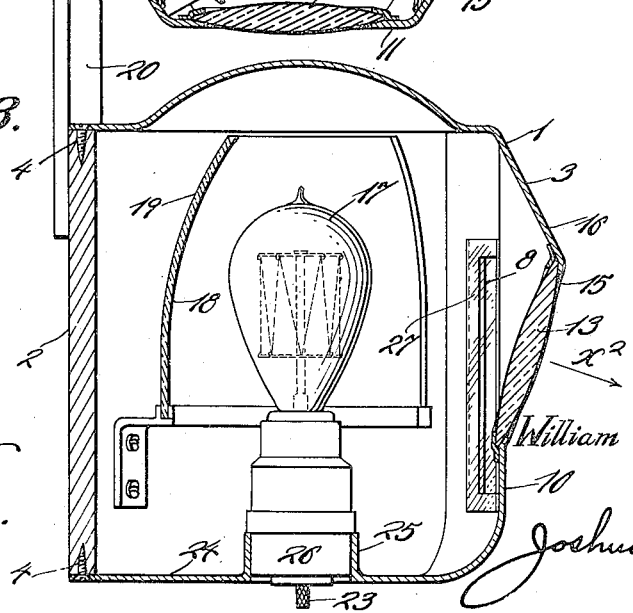

WILLIAM S. THOMAS, OF LOCK HAVEN, PENNSYLVANIA.

LAMP.

1,242,076.     Specification of Letters Patent.    Patented Oct. 2, 1917.

Application filed October 14, 1916. Serial No. 125,640.

*To all whom it may concern:*

Be it known that I, WILLIAM S. THOMAS, a citizen of the United States, residing at Lock Haven, in the county of Clinton and State of Pennsylvania, have invented certain new and useful Improvements in Lamps, of which the following is a specification.

My invention consists of an improved lamp, and is particularly serviceable for use on the rear end of automobiles or other vehicles.

One object of my invention is to provide a lamp of the above described type which may be electrically controlled to illuminate the ground adjacent the rear wheel of an automobile or other vehicle so that the driver may safely back his vehicle and will thereby know the condition of the surrounding ground which it is especially desirable to know when traveling over dark country roads, etc., since accidents have often occurred by a driver of a vehicle backing into a ditch or over other irregular surfaced ground.

A further object is to so construct my lamp that it will also include a rear signal light, such for example as a red light as is required by law in a number of the States throughout the country, and furthermore to illuminate the license tag or plate which is usually carried on the rear part of the vehicle.

A further object is to so construct my invention that it will be neat and attractive in appearance and that the light which illuminates the ground may be extinguished at the will of the driver or other occupant of the vehicle.

Another object of my invention is to provide a source of light, additional to the light which illuminates the ground, which during the ordinary running of the car will illuminate and show a red signal at the rear of the lamp and will also reflect its rays upon the license plate.

These objects, and other advantageous ends which will be described hereinafter, I attain in the following manner, reference being had to the accompanying drawings in which Figure 1 is a fragmentary elevation of the rear end of an automobile having my improved lamp thereon.

Fig. 2 is an enlarged transverse sectional plan view on the line *a—a* of Fig. 1.

Fig. 3 is a section on the line *b—b* of Fig. 2.

Referring to the drawings, my improved lamp includes a casing 1 having a rear section 2 which is detachably connected to a front section 3 by means of screws 4 or other suitable means. The front section 3 is of a general triangular cross section as shown in Fig. 2, and is preferably made of sheet metal which is blocked or shaped into the form illustrated.

A lens 5, preferably made of red glass, is positioned in the extreme forward portion of the front section 3 of the casing, and a small electric bulb 6 is placed directly to the rear of said red lens 5, so that when said electric bulb is lighted, its rays of light will penetrate the red lens 5 and may be seen from the rear of the vehicle.

The portion of the casing 1 which is adjacent the lens tag (see Fig. 1) has a slot 8 through which rays from the light 6 penetrate and serve to illuminate said license tag. A reflector 9 is preferably secured to the inner portion of the casing and in such position as to reflect rays from the light 6 through said slot to add to the illumination of said license plate (see Fig. 2).

The sides 9 and 10 of the front section 3 of the casing 1 converge toward the extreme front 11 of said casing, and transparent or translucent lenses 12 and 13 are mounted in register with openings 14 and 15 in said side portions 9 and 10.

The sides 9 and 10 of said casing are bulged adjacent their upper portions as shown at 16 in Fig. 3, so as to project outwardly beyond the lower adjacent portions of the casing, said casing between the projecting portions and said lower adjacent portions having the openings 14 and 15 formed therein. The lenses 12 and 13 fitting within said openings 14 and 15 are therefore tilted and receive light from an electric bulb 17 and direct said light to the ground as indicated by the arrows *x* and *x'* in Fig. 1.

The bulb 17 is preferably of a high candle power so that said lenses 12 and 13 will direct the rays of light therefrom at an angle downwardly and toward the points of engagement of the rear wheels with the ground. The bulb 17 is placed substantially central within the front portion 3 of the casing 1, and a reflector 18 is positioned to the rear of the bulb 17 and secured to the rear 2 of the casing.

The upper portion of the reflector 18 is preferably formed in the shape shown in Fig. 3, that is, with the upper portion 19 curved forwardly to reflect the rays of light at an angle as shown by the arrows $x^2$ in Fig. 3, thus greatly intensifying the illumination of the ground.

The rear 2 of the casing is preferably provided with brackets 20 which are designed to be secured to the rear portion 21 of the automobile or other vehicle 22 as illustrated in Fig. 1.

I have described the elements 6 and 17 as electric bulbs which are known in the trade as electric lamps, however, it will be understood that any source of light may be substituted in lieu of said bulbs 6 and 17. I preferably use the electric bulbs 6 and 17 since either or both may be extinguished by the throwing out of switches (not illustrated) and electric wires may be connected to either of these bulbs such for example as shown at 23 in Fig. 3.

The source of electricity may either come from the storage battery or other generator.

The bottom portion 24 of the casing as illustrated in Fig. 3, has an upwardly projecting flange providing a hole 25 for the seating of the socket 26 of the bulb 17, and it will be noted that the bulb 6 may be mounted in a similar flanged opening or in any other suitable manner.

The slot 8 is preferably covered by a piece of transparent or translucent material such as isinglass or white celluloid as shown at 27 in Fig. 3.

It will be noted that while the bulb 6 is, during the ordinary forward running of a vehicle in a state of incandescency and acts to illuminate the signal lens 5, that the bulb 17 will also when in incandescency serve to amplify the illumination of said signal lens 5, so that in this capacity the bulb 17 serves as an auxiliary illuminating element to the bulb 6. This is especially desirable either when the vehicle is backing or standing still, since at these times it is desirable that the signal lens 5 be plainly seen by drivers of oncoming vehicles.

While I have described the elements 5, 12, and 13 as lenses, it will be noted that plate glass, celluloid, or other transparent or translucent material may be employed, however, I prefer to use such elements in the form of lenses as above described.

I am aware of the fact that lamps have been made prior to my invention which include a source of light and which penetrates a red or other colored signal lens. I am also aware of the fact that lamps have been made which provide illumination for the license plate or tag, however, I am not aware of the fact of a lamp having been made prior to my invention which includes two sources of light in direct alinement with said signal lens, one being normally operative to produce the signal and illuminate a license tag, the other being operative to direct the rays of light through lenses which are so placed as to illuminate the ground adjacent the rear ends of a vehicle, and which will also serve to amplify the illumination of the signal lens, so that the latter may be seen more distinctly.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A lamp for vehicles comprising a casing having a signal lens therein, a source of light positioned within the casing and in alinement with said lens, said casing having an opening positioned with respect to said source of light to permit the rays thereof to pass therethrough and illuminate the ground, and a second source of light within the casing and in alinement with said lens, both of said sources of light being arranged to permit their rays to pass outwardly through said lens, substantially as described.

2. A lamp for vehicles comprising a casing having a signal lens therein, a source of light positioned within the casing and in alinement with said lens, said casing having an opening positioned with respect to said source of light to permit the rays thereof to pass therethrough and illuminate the ground, and a second source of light interposed between said signal lens and the first source of light and operative to illuminate said lens either independently of or together with said first source of light, substantially as described.

3. A lamp for vehicles comprising a casing having a signal lens therein, a source of light positioned within the casing and in alinement with said lens, said casing having an opening positioned with respect to said source of light to permit the rays thereof to pass therethrough and illuminate the ground, and a second source of light within said casing and located between the lens and said first source of light, said casing also having an opening in the side thereof in line with the second source of light, substantially as described.

4. A lamp for vehicles comprising a casing having a signal lens therein, a source of light positioned within the casing and in alinement with said lens, said casing having an opening positioned with respect to said source of light to permit the rays thereof to pass therethrough and illuminate the ground, a second source of light within said casing and located between the lens and said first source of light, said casing also having an opening in the side thereof in line with the second source of light, and a reflector for said second source of light designed to reflect the rays thereof through said latter opening, substantially as described.

5. A lamp for vehicles comprising a casing, a signal lens therein, a source of light within the casing and in alinement with said lens, said casing having openings positioned to permit the rays of light from said source to pass therethrough and to illuminate the ground, and a second source of light within said casing and located between said first source of light and the lens, said second source of light being operative to illuminate the lens either independently of or together with said first source of light, substantially as described.

6. A lamp for vehicles comprising a casing, a source of light positioned within the casing, said casing having openings in opposite sides thereof positioned to permit the rays of light from said source to be deflected in a divergent manner toward and to illuminate the ground upon which the vehicle moves, a signal member in said casing positioned to be illuminated by said source of light, a second source of light within said casing for illuminating said signal member either independently of or together with said first source of light, substantially as described.

7. A lamp for vehicles comprising a casing having converging side portions, each having a hole therein, a source of light positioned within said casing, said openings being so positioned with respect to said source of light as to permit the rays of light to be projected therethrough in a divergent manner toward and to illuminate the ground supporting said vehicle, a signal member in said casing positioned between said openings and designed to be illuminated by said source of light, and a second source of light designed to illuminate said signal member either independently of or together with said first source of light, substantially as described.

8. A lamp for vehicles comprising a casing having converging side portions, each having a hole therein, a source of light positioned within said casing, said openings being so positioned with respect to said source of light as to permit the rays of light to be projected therethrough in a divergent manner toward and to illuminate the ground supporting said vehicle, a signal member in said casing positioned between said openings and designed to be illuminated by said source of light, a second source of light designed to illuminate said signal member either independently of or together with said first source of light, said casing having another opening therein in line with said second source of light, substantially as described.

In testimony whereof I have signed my name to this specification in the presence of two subscribing witnesses.

WILLIAM S. THOMAS.

Witnesses:
RHODA E. GILLIES,
CHAS. E. POTTS.